(12) United States Patent
Yasutomi

(10) Patent No.: US 10,623,637 B2
(45) Date of Patent: Apr. 14, 2020

(54) IMAGE PICKUP APPARATUS, CONTROL METHOD, AND STORAGE MEDIUM

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/048,580

(22) Filed: Jul. 30, 2018

(65) Prior Publication Data

US 2019/0045118 A1 Feb. 7, 2019

(30) Foreign Application Priority Data

Aug. 1, 2017 (JP) ................................. 2017-149313

(51) Int. Cl.
*H04N 7/00* (2011.01)
*H04N 5/232* (2006.01)
*G06T 3/40* (2006.01)

(52) U.S. Cl.
CPC ....... *H04N 5/23238* (2013.01); *G06T 3/4038* (2013.01); *H04N 5/23222* (2013.01); *H04N 5/23254* (2013.01); *H04N 5/23293* (2013.01); *H04N 5/232945* (2018.08)

(58) Field of Classification Search
CPC ......... H04N 5/23238; H04N 5/232945; H04N 5/23222; H04N 5/23254; H04N 5/23293; G06T 3/4038
USPC ................ 348/36, 39, 42, 46, 49, 51, 61, 64
See application file for complete search history.

(56) References Cited

U.S. PATENT DOCUMENTS

2018/0095533 A1* 4/2018 Song .................. H04N 5/23238
2018/0096452 A1* 4/2018 Kim ...................... G06T 3/4038

FOREIGN PATENT DOCUMENTS

JP 11-331696 A 11/1999
JP 2005-328497 A 11/2005

* cited by examiner

*Primary Examiner* — Robert Chevalier
(74) *Attorney, Agent, or Firm* — Cowan, Liebowitz & Latman, P.C.

(57) ABSTRACT

There is provided an image pickup apparatus comprising an image sensor configured to successively pick up a plurality of images for compositing of a panorama image, a memory configured to store instructions, a monitor, and a processor connected to the memory. The processor executes the instructions to specify a region that is not to be used in compositing of the panorama image in each of the plurality of images, based on a state of an optical system used at a time of pick-up of the plurality of images. The monitor displays the specified region along with an image.

16 Claims, 8 Drawing Sheets

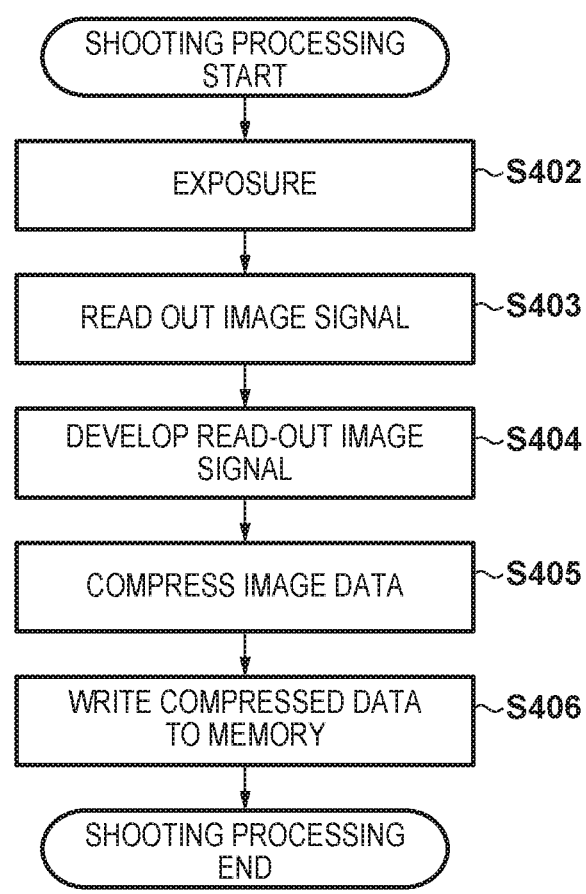

IMAGE PICKUP APPARATUS, CONTROL METHOD, AND STORAGE MEDIUM

BACKGROUND OF THE INVENTION

Field of the Invention

The present invention relates to an image pickup apparatus, a control method, and a storage medium.

Description of the Related Art

Technology for generating a panoramic full image (panorama image) from a plurality of unit images is known (Japanese Patent Laid-Open No. 2005-328497). The image pickup apparatus of Japanese Patent Laid-Open No. 2005-328497 successively changes a shooting direction and picks up unit images that form parts of a shooting range, extracts image regions of a predetermined size that form parts of the unit images to create mutually overlapping regions, and successively superimposes the image regions that have been extracted. Accordingly, a panorama image that shows the entire shooting range is generated. Furthermore, Japanese Patent Laid-Open No. 11-331696 discloses technology in which, if it is determined that the method of shooting is panning shooting, the picked-up images are subject to a cylindrical coordinate transform onto a virtual cylindrical surface that has the focal distance as its radius, and a panorama image is generated from the transformed images.

As shown in FIG. 3A, when a cylindrical coordinate transform is performed, the size (pixel count) in the up-down direction (height direction) becomes smaller than in the original image at both ends of a transformed image. Accordingly, when the camera is moved in the horizontal direction to pick up a panorama image, processing is performed that generates a panorama image from the central region without using the end portions of the transformed image (see FIG. 3B) in order to suppress a reduction in the pixel count in the up-down direction of the panorama image that is eventually generated. In FIG. 3B, a hatched portion is an image saving region (the image region that is used to generate a panorama image), and regions other than that (unsaved regions) are not saved. Also, when the camera is moved in the vertical direction to pick up a panorama image, the relationship between the up-down direction (height direction) and the left-right direction (horizontal direction) is switched, but the same phenomenon occurs. Note that although only the left side of an image is shown in FIG. 3B, the same follows for the right side as well.

Also, depending on the transform coefficient in the cylindrical coordinate transform, there are cases where the up-down direction in an image does not form a straight line. In this case as well, the image saving region becomes narrower.

In FIG. 3A, the size reduction that accompanies the cylindrical coordinate transform is more notable the shorter the focal length is, as can be understood from a comparison of the case of a focal length (f) of 18 mm and the case of 11 mm. Panorama images often have spanning large-scale scenery as its shooting subject, and because wide angle lenses that have short focal lengths tend to be used more frequently, the occurrence of the problems mentioned above become more notable.

However, conventional cameras display what is referred to as "through-the-lens images", which are output from an image sensor to a liquid crystal display (monitor) during the shooting of a panorama image. For this reason, a user cannot know which region of a through-the-lens image will become an image saving region (from which regions the panorama image will be generated).

SUMMARY OF THE INVENTION

The present invention has been made in view of the above situation, and provides technology that supports user recognition of image regions that have a possibility of not being included in a panorama image when picking up images that will become the basis of a panorama image.

According to a first aspect of the present invention, there is provided an image pickup apparatus, comprising: an image sensor configured to successively pick up a plurality of images for compositing of a panorama image; a memory configured to store instructions; a monitor; and a processor connected to the memory and configured to execute the instructions to: specify a region that is not to be used in compositing of the panorama image in each of the plurality of images, based on a state of an optical system used at a time of pick-up of the plurality of images, wherein the monitor displays the specified region along with an image.

According to a second aspect of the present invention, there is provided a control method executed by an image pickup apparatus having an image sensor and a monitor, comprising: successively picking up, by the image sensor, a plurality of images for compositing of a panorama image; specifying a region that is not to be used in compositing of the panorama image in each of the plurality of images, based on a state of an optical system used at a time of pick-up of the plurality of images; and displaying, on the monitor, the specified region along with an image.

According to a third aspect of the present invention, there is provided a non-transitory computer-readable storage medium which stores a program for causing a computer of an image pickup apparatus having an image sensor and a monitor to execute a control method comprising: successively picking up, by the image sensor, a plurality of images for compositing of a panorama image: specifying a region that is not to be used in compositing of the panorama image in each of the plurality of images, based on a state of an optical system used at a time of pick-up of the plurality of images; and displaying, on the monitor, the specified region along with an image.

Further features of the present invention will become apparent from the following description of exemplary embodiments with reference to the attached drawings.

BRIEF DESCRIPTION OF THE DRAWINGS

FIG. 4 is a flowchart of shooting processing that the digital camera 100 executes.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 2A:
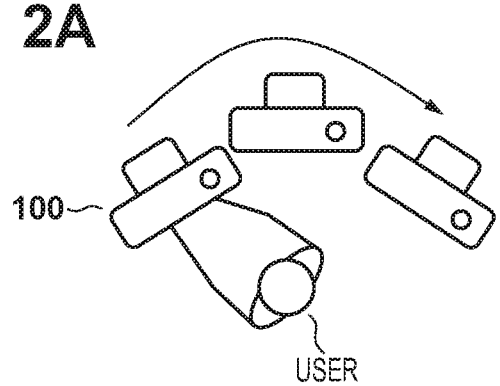
FIGS. 2A to 2B are diagrams that illustrate a summary of panorama shooting.
Figure 2B:
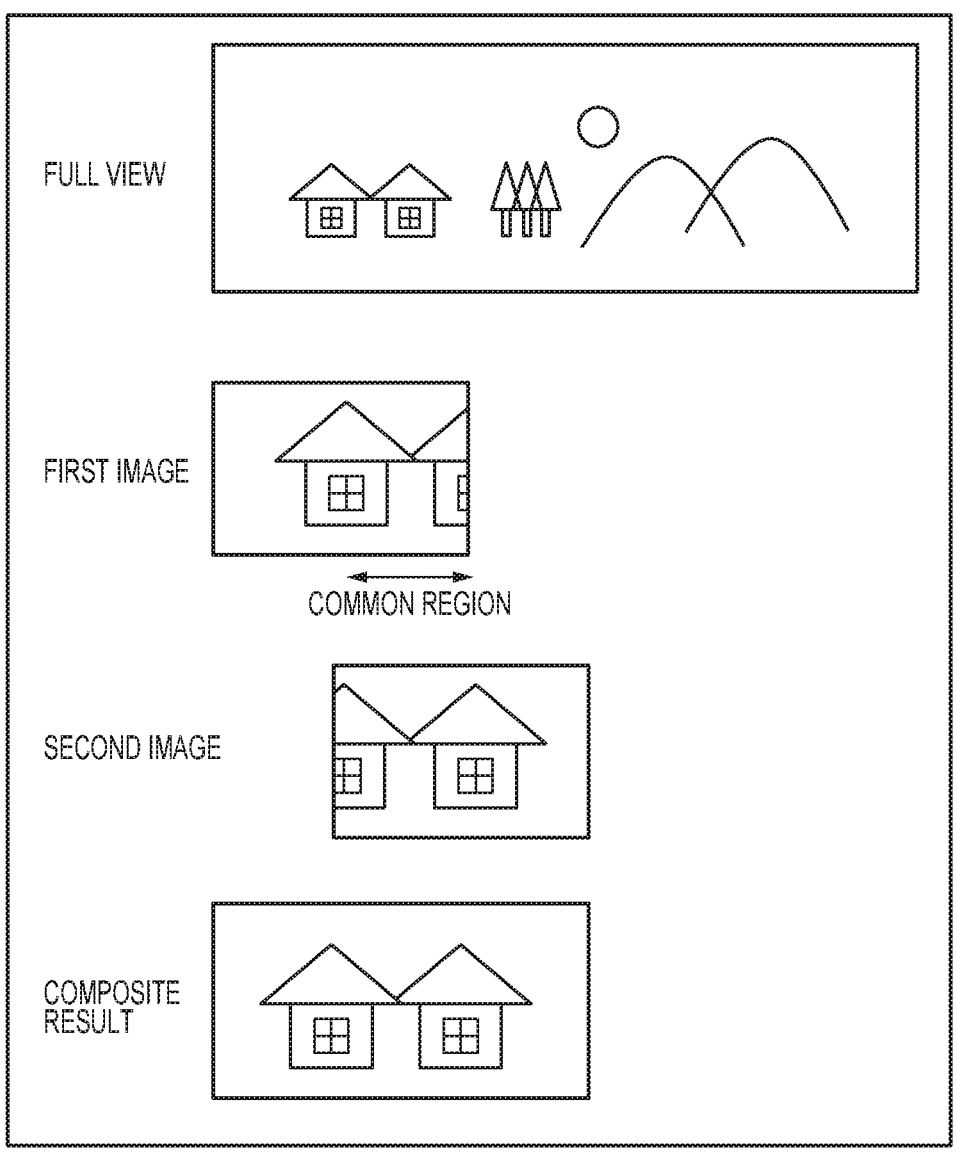

Hereinafter, a summary of panorama shooting will be described with reference to FIGS. 2A and 2B. As shown in FIG. 2A, a plurality of images are picked up successively while a user moves a digital camera 100. The movement of the digital camera 100 may be performed by an automatic camera platform or the like. As shown in FIG. 2B, the user performs shooting such that common regions (overlapping regions) of a shooting subject are included in the images that have been picked up.

The digital camera 100 subjects the picked-up images to processing that corrects distortion of an optical lens (pick-up lens), and processing for mapping onto a virtual cylinder that has the focal length of the optical lens as its radius (cylindrical coordinate transform processing). Also, the digital camera 100 extracts feature points in the common regions of the images, and detects movement vectors that indicate the extent of movement of the feature points. The digital camera 100 performs a transform into an affine transform coefficient or the like based on the movement vectors, and overlays two images such that the feature points are aligned. Accordingly, an image in which portions other than the common area are expanded is obtained. By repeating this a plurality of times, it is possible to generate a panorama image that covers a wider range than a single picked-up image.

Figure 1:
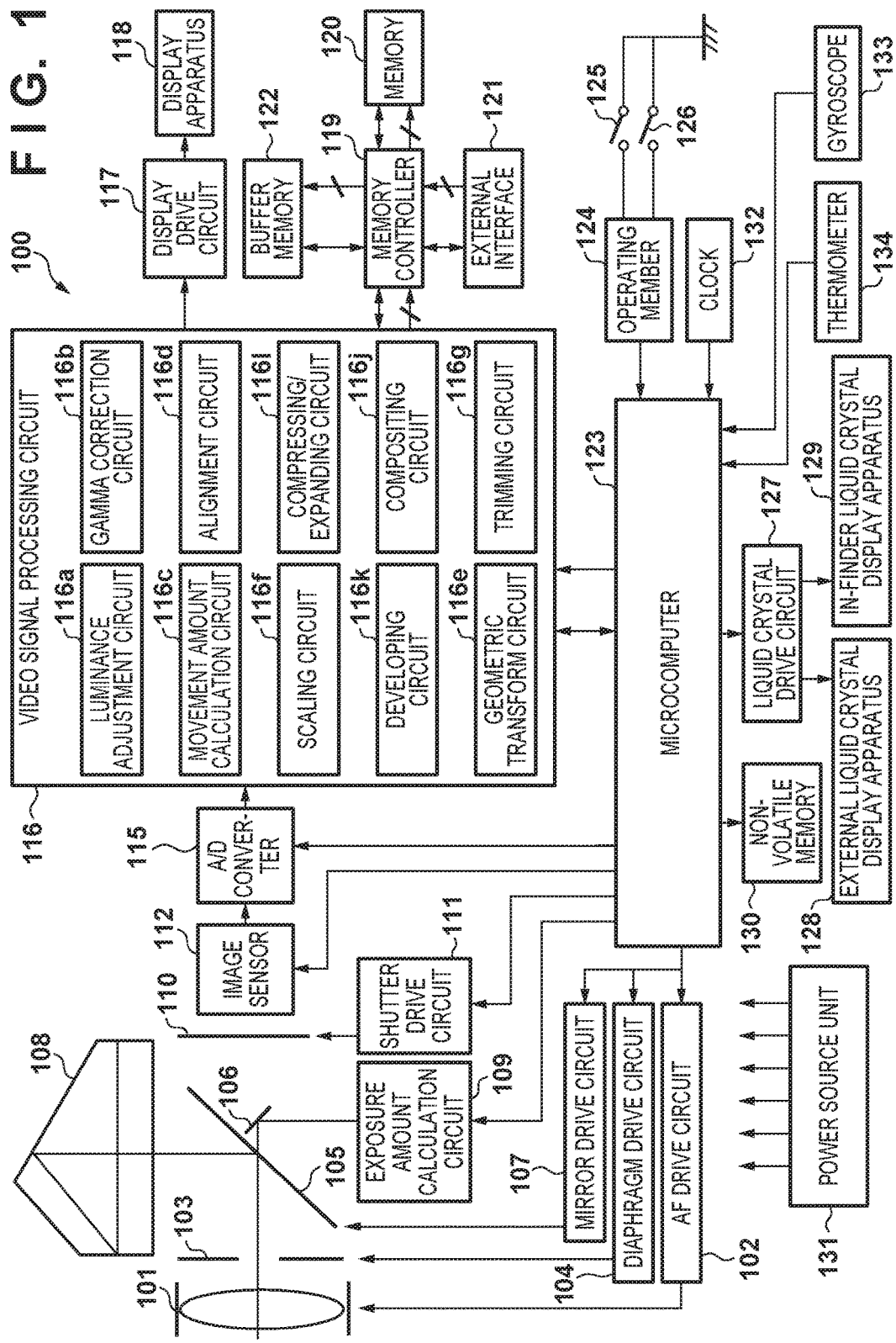
FIG. 1 is a block diagram showing a digital camera 100.

FIG. 1 is a block diagram of the digital camera 100. In FIG. 1, 101 is a pick-up lens. Reference sign 102 is an AF (autofocus) drive circuit. The AF drive circuit 102 is constituted by, for example, a DC motor or stepping motor, and performs focusing by changing the focus lens position of the pick-up lens 101 under control of a microcomputer 123. Reference sign 103 is diaphragm. Reference sign 104 is a diaphragm drive circuit. The diaphragm drive circuit 104 drives the diaphragm 103. The amount to be driven is calculated by the microcomputer 123. Thus, the optical aperture value changes.

Reference sign 105 is a main mirror for the purpose of switching a light beam that is incident from the pick-up lens 101 between a viewfinder side and an image sensor 112 side. The main mirror 105 is, under normal conditions, arranged to reflect a light beam such that it is lead to the viewfinder side, but in cases where shooting is performed or the live view is displayed, it springs upward out of the light beam so as to lead the light beam to the image sensor 112. Also, the main mirror 105 is a half mirror such that the central portion can transmit a portion of the light, and a portion of the light beam is transmitted so as to be incident on a sensor (not shown) for performing focus detection.

Reference sign 106 is a sub mirror for the purpose of reflecting a light beam from the main mirror 105 and leading it to a sensor for performing focus detection and a sensor that is arranged within an exposure amount calculation circuit 109. Reference sign 107 is a mirror drive circuit that drives the main mirror 105 under control of the microcomputer 123. Reference sign 108 is a pentaprism that constitutes a viewfinder. The viewfinder is also constituted by a focus board (not shown), an eye piece lens (not shown), and the like.

Reference sign 109 is an exposure amount calculation circuit. The light beam that passed through the central portion of the main mirror 105 and was reflected by the sub mirror 106 arrives at a sensor for performing photoelectric conversion, which is arranged in the exposure amount calculation circuit 109.

The defocus amount, which is for use in focus calculations, can be obtained by calculation based on the output of the sensor for performing focus detection. The microcomputer 123 evaluates the calculation result, instructs the AF drive circuit 102, and drives the focus lens.

Reference sign 110 is a focal-plane shutter. Reference sign 111 is a shutter drive circuit, which drives the focal-plane shutter 110. The opening time of the focal-plane shutter 110 is controlled by the microcomputer 123.

Reference sign 112 is an image sensor. The image sensor 112 is a CCD or CMOS sensor or the like, and converts a subject image formed by the pick-up lens 101 into an electrical signal. Reference signal 115 is an A/D converter. The A/D converter 115 converts an analog output signal of the image sensor 112 into a digital signal.

Reference sign 116 is a video signal processing circuit and is realized by a logic device such as a gate array. The video signal processing circuit 116 includes a luminance adjustment circuit 116a that adjusts the brightness according to a digital gain, a gamma correction circuit 116b that adjusts luminance according to a gamma characteristic, and a movement amount calculation circuit 116c that calculates an amount of shake (movement amount) of a plurality of images. The video signal processing circuit 116 also includes an alignment circuit 116d that performs alignment according to the movement amount, a geometric transform circuit 116e that corrects distortion of the pick-up lens 101 and performs a cylindrical coordinate transform, and a scaling circuit 116f that changes the size of an image. The video signal processing circuit 116 also includes a trimming circuit 116g that extracts parts of an image, a compositing circuit 116j that composites a plurality of images, a developing circuit 116k, a compressing/expanding circuit 116l that performs processing for conversion into a standard image format such as JPEG, and the like.

Reference sign 117 is a display drive circuit. Reference sign 118 is a display apparatus using TFT, organic EL, or the like. Reference sign 119 is a memory controller. Reference sign 120 is a memory. Reference sign 121 is an external interface that can connect to a computer and the like. Reference sign 122 is a buffer memory.

The video signal processing circuit 116 performs filter processing, color conversion processing, and gamma processing on digitized image data, along with JPEG compression processing or the like, and outputs it to the memory controller 119. At this time, it is possible to temporarily put an image in the buffer memory 122 as it is being processed. The video signal processing circuit 116 can also output a video signal from the image sensor 112 or output image data that has been conversely input from the memory controller 119 to the display apparatus 118 via the display drive circuit 117. The switching of these functions is performed according to instructions from the microcomputer 123.

The video signal processing circuit 116 can output information such as white balance or exposure information of a signal from the image sensor 112 as needed to the microcomputer 123. The microcomputer 123 gives white balance or gain adjustment instructions based on this information. The microcomputer 123 can temporarily store picked-up data in the buffer memory 122 as unprocessed images in the case of a continuous shooting operation. Afterwards, the microcomputer 123 reads out the unprocessed image data through the memory controller 119, performs image processing and compression processing with the use of the video signal processing circuit 116, and performs continuous shooting. The number of images taken continuously is determined by the size of the buffer memory 122 or by the size of the image in the case of panorama shooting.

The memory controller 119 stores unprocessed digital image data input from the video signal processing circuit 116 in the buffer memory 122, and stores processed digital image data in the memory 120. Also, the memory controller 119 conversely outputs image data from the buffer memory 122 and the memory 120 to the video signal processing circuit 116.

The memory 120 can, in some instances, be removed. The memory controller 119 can output an image that is stored in the memory 120 via the external interface 121 that can connect to a computer and the like.

Reference sign 123 is a microcomputer. Reference sign 124 is an operating member. The operating member 124 conveys its status to the microcomputer 123, and the microcomputer 123 controls the units of the digital camera 100 according to changes in the status of the operating member 124.

Reference sign 125 is a switch 1 (SW1). Reference sign 126 is a switch 2 (SW2). The SW1 125 and SW2 126 are switches that that turn on and off according to operations of a release button, and are each one of the input switches of the operating member 124. The state where only the SW1 125 is on is the state where the release button is pressed halfway, and in this state, the microcomputer 123 performs a photometric operation along with an autofocus operation. The state where the SW1 125 and the SW2 126 are both on is the state where the release button is fully pressed, which is also the ON state of the release button for recording an image. Image pick-up is performed in this state. Also, a continuous shooting operation is performed while the SW1 125 and the SW2 126 are continually in the ON state.

The operating member 124 is also connected to switches (not shown) that correspond to an ISO setting button, a menu button, a set button, a flash setting button, and a single shot/continuous shot/self-timer button. The operating member 124 is also connected to switches (not shown) that correspond to a move + (plus) button and a move − (minus) button for moving through menus and playback images, an exposure correction button, a display image enlargement button, a display image reduction button, and a playback switch. The operating member 124 is also connected to switches that correspond to an aperture button that changes the diaphragm 103 to the set aperture, an erase button for erasing images that have been picked-up, an information display button related to shooting and playback, and the like. The microcomputer 123 detects the status of each switch. Also, it is possible to more easily select functions and values by providing a rotary dial switch to realize the functions of the plus button and the minus button.

Reference sign 127 is a liquid crystal drive circuit. Reference sign 128 is an external liquid crystal display apparatus. Reference sign 129 is an in-finder liquid crystal display apparatus. In accordance with display content instructions from the microcomputer 123, the liquid crystal drive circuit 127 drives the external liquid crystal display apparatus 128 and the in-finder liquid crystal display apparatus 129 that display an operational status, a message, and the like, using letters and images. Also, the in-finder liquid crystal display 129 is provided with back lighting such as an LED (not shown), and the LED is also driven by the liquid crystal drive circuit 127.

The microcomputer 123 can calculate the remaining number of images that can be picked up based on a check of the memory capacity through the memory controller 119, based on predictive value data of an image size according to ISO sensitivity, image size, and image quality, which are set before pick-up. The microcomputer 123 can display the remaining number of possible images on the external liquid crystal display apparatus 128 and the in-finder liquid crystal display apparatus 129 as needed.

Reference sign 130 is a nonvolatile memory (EEPROM) that can save data even when the digital camera 100 is not powered on. Reference sign 131 is a power source unit. The power source unit 131 supplies power necessary for the IC's and drive systems. Reference sign 132 is a clock. The microcomputer 123 uses the clock unit 132 to save the time of pick-up to an image file recorded to the memory 120 and superimposes the time of pick-up onto an image.

Reference sign 133 is a gyroscope. The gyroscope 133 detects the angular velocity of rotation of the digital camera 100 in two axes or three axes.

Reference sign 134 is a thermometer. The thermometer 134 is preferably arranged in the vicinity of the gyroscope sensor, but normally may be a sensor arranged in the vicinity of the image sensor 112, the memory 120 or the like for the protection of the digital camera 100 or the memory 120.

The shooting processing executed by the digital camera 100 will be described below with reference to FIG. 4. Unless otherwise noted, the processing of the steps in the flowchart in FIG. 4 is achieved by the microcomputer 123 controlling the units of the digital camera 100 by executing control programs stored in the nonvolatile memory 130. The shooting processing begins when the SW2 126 is pressed down by the user. Note that the microcomputer 123 calculates the exposure amount via the exposure amount calculation circuit 109, and sets the aperture, accumulation time, and ISO sensitivity in advance.

In step S402, the microcomputer 123 performs exposure. Specifically, the microcomputer 123 notifies the aperture determined in advanced to the diaphragm drive circuit 104 and sets the diaphragm 103 to the target aperture. Also, the microcomputer 123 powers on the image sensor 112, the A/D converter 115, and the like, and performs preparation for shooting. When the preparation is complete, the microcomputer 123 drives the mirror drive circuit 107 and causes the subject image to be formed on the image sensor 112. The shutter drive circuit 111 opens a front cover (not shown) of the focal-plane shutter 110 and causes a shooting subject image to form on the image sensor 112. Then, the shutter drive circuit 111 closes a back cover (not shown) of the focal-plane shutter 110 after a predetermined accumulation time, and causes light to enter into the image sensor 112 only during the pre-determined accumulation time.

In step S403, the microcomputer 123 reads out an image signal to the video signal processing circuit 116 via the A/D converter 115 and stores the image signal in the buffer memory 122.

In step S404, microcomputer 123 uses the developing circuit 116k and performs development that converts the read-out image signal into image data. At this time, the microcomputer 123 can perform image processing such as white balance processing to obtain an appropriate image, or processing which uses the gamma correction circuit 116*b* to apply gain to dark portions.

In step S405, the microcomputer 123 uses the compressing/expanding circuit 116*l* to perform compression processing that converts the obtained image data to a general purpose data format such as JPEG.

In step S406, the microcomputer 123 saves the compressed image data to the memory 120, such as an SD card or a compact flash drive (registered trademark).

Note that a configuration is possible in which the microcomputer 123, does not performing the image processing and development processing of step S404, and instead losslessly compresses the read-out image signal in step S405 as it is, and saves the losslessly compressed image signal to the memory 120 in step S406. The switch of whether or not to perform compression processing can be made by the user by using the operating member 124.

The following describes a summary of a panorama shooting mode. Panorama shooting has a mode in which the digital camera 100 is moved in a horizontal direction during shooting and a mode in which it is moved in a vertical direction during shooting, but the following shows an example of performing shooting while moving in the horizontal direction.

If the user sets the digital camera 100 to the panorama shooting mode via the operating member 124, the microcomputer 123 supplies power to the image sensor 112 and the A/D converter 115, and performs initial setting. Also, the microcomputer 123 raises the main mirror 105, and the shutter drive circuit 111 opens the focal-plane shutter 110 to form a subject image on the image sensor 112 through the pick-up lens 101.

The signal from the image sensor 112 is converted into a digital signal by the A/D converter 115 and is developed by the developing circuit 116*k* of the video signal processing circuit 116. Also, the developed signal is converted into an appropriate image by the luminance adjustment circuit 116*a* and the gamma correction circuit 116*b*, and is scaled to an appropriate size for the display apparatus 118 by the scaling circuit 116*f*, and is displayed on the display apparatus 118. By repeating this 24 to 60 times per second, a so-called live view can be displayed.

The user sets the angle of view while checking the live view display. In the case of panorama shooting, the user faces the digital camera 100 toward a subject that will become a main subject in a wide range and presses the SW1 125. The microcomputer 123 calculates an exposure amount when the SW1 125 is pressed. If the live view is not being displayed, the exposure amount calculation circuit 109 receives light that has been reflected by the sub-mirror 106 and calculates an optimum exposure amount. While the live view is being displayed, an exposure amount calculation circuit (not shown) included in the video signal processing circuit 116 calculates an optimum exposure amount. The microcomputer 123 uses the diaphragm drive circuit 104 to drive the diaphragm 103 based on the calculated exposure amount, and controls the accumulation time and the sensitivity of the image sensor 112. Also, the AF drive circuit 102 drives the pick-up lens 101 and obtains focus. When preparation for shooting is complete, the microcomputer 123 notifies the user via a buzzer (not shown) or the like.

Next, the user faces the digital camera 100 in an initial desired shooting direction and then presses the SW2 126 down. The digital camera 100 performs the actual panorama shooting when the SW2 126 is pressed.

Figure 5:
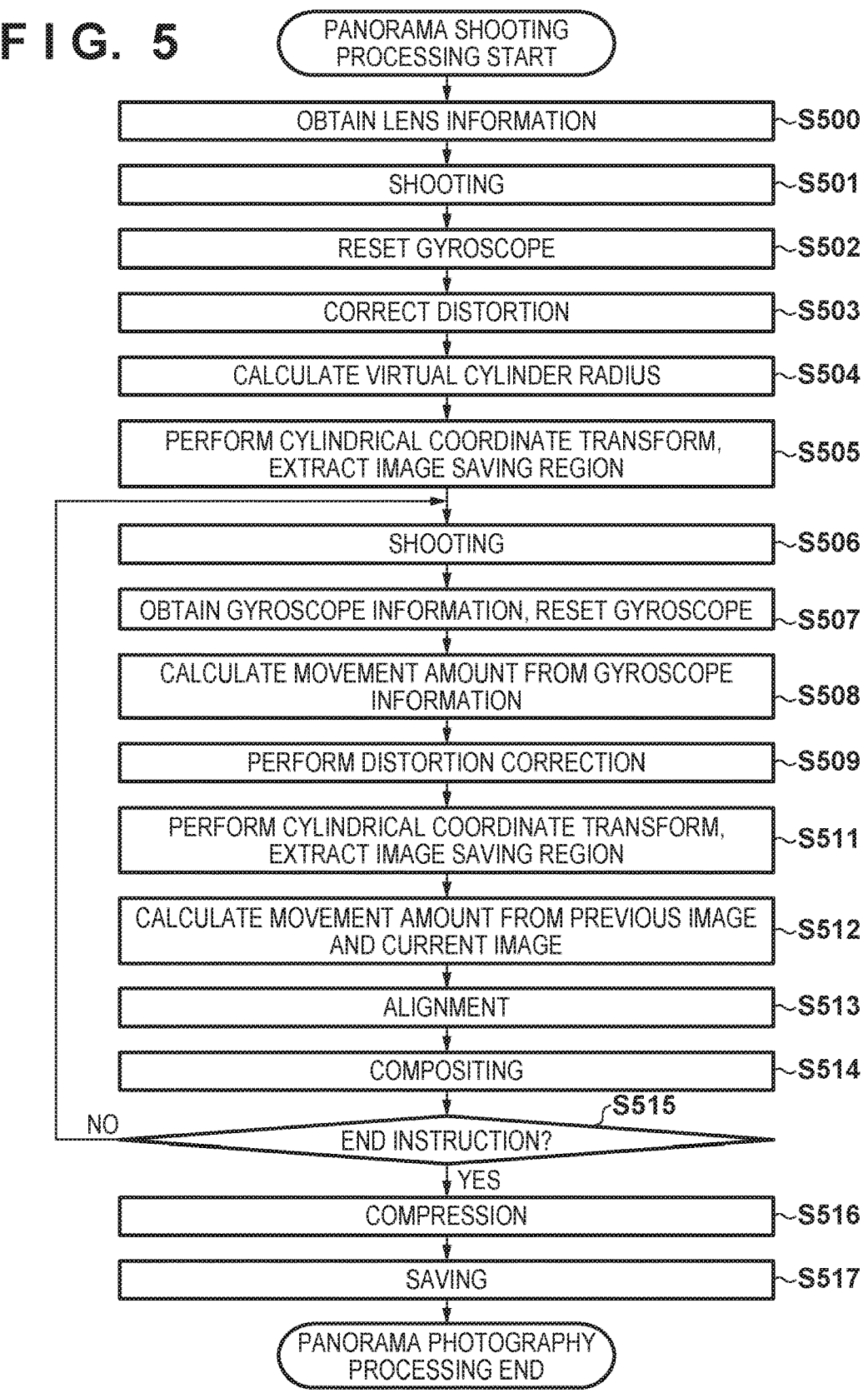
FIG. 5 is a flowchart of panorama shooting processing.

Details of panorama shooting will be described below with reference to FIGS. 5 and 6. Unless otherwise noted, the processing of the steps of the flowchart of FIG. 5 is achieved by the microcomputer 123 controlling the units of the digital camera 100 by executing control programs stored in the nonvolatile memory 130.

In step S500, the microcomputer 123 acquires lens information. This lens information includes data for the correction of distortion that is described later and low light levels of a lens peripheral portion, the focal distance used in a cylindrical coordinate transform also described later, and the like.

In step S501, the microcomputer 123 picks up the first image. Because the image sensor 112 and the A/D converter 115 are set to driving for live view, the microcomputer 123 switches to driving for still image shooting. The microcomputer 123 adjusts the diaphragm 103 to the previously determined exposure amount, opens and shuts the focal-plane shutter 110, and causes a subject image to form on the image sensor 112. As described above, the subject image that forms on the image sensor 112 is converted into a digital signal by the A/D converter 115, and is stored in the buffer memory 122. Correction of shading of the image sensor 112 and the like is performed on image data obtained in this manner via a circuit (not shown) included in the video signal processing circuit 116. Such image data that has undergone a minimal level of processing is called a RAW image. As shown in FIG. 6, a RAW image 605 is developed by the developing circuit 116*k* and becomes a developed image (YUV image) 606. In order to display the picked-up image on the display apparatus 118, the scaling circuit 116*f* reduces the developed image 606 according to the pixel count of the display apparatus 118, and stores it in a VRAM 608.

In step S502, the microcomputer 123 initializes (resets) the gyroscope 133. This processing is performed in order to acquire the extent that the digital camera 100 has been swung (rotated) up to the point when the second image is to be picked up in step S506.

In step S503, the microcomputer 123 performs distortion correction processing. That is, as shown in FIG. 6, processing that corrects distortion aberration of the pick-up lens 101 is performed on the developed image 606 by the geometric transform circuit 116*e* using existing technology.

In step S504, the microcomputer 123 calculates the radius of a virtual cylinder in order to perform a cylindrical coordinate transform, based on the focal distance acquired in step S502.

Figure 3A:
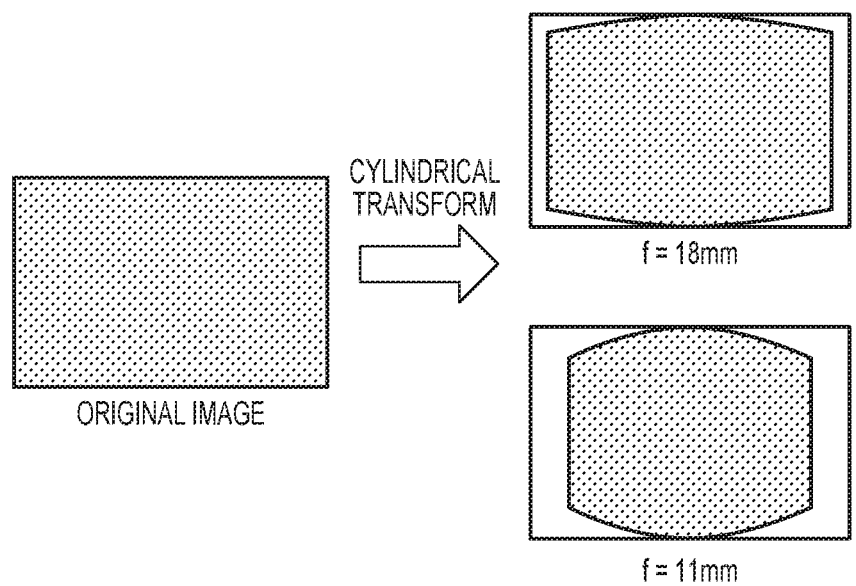
FIG. 3A is a conceptual diagram of a cylindrical coordinate transform.
Figure 3B:
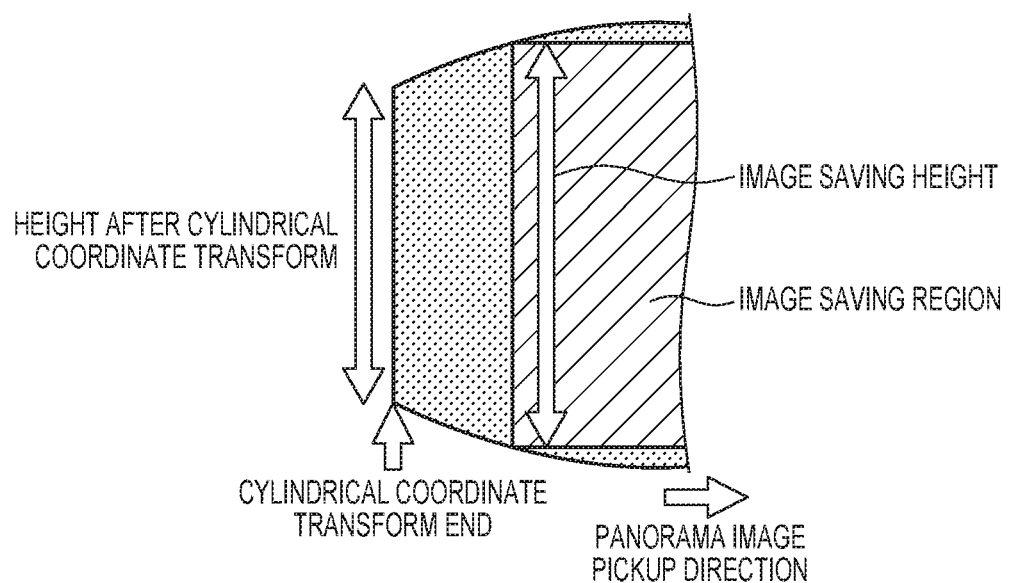
FIG. 3B is a diagram illustrating an image saving region and unsaved regions in an image after a cylindrical coordinate transform.

In step S505, the microcomputer 123 uses the radius of the virtual cylinder that was calculated in step S504 to perform a cylindrical coordinate transform. As shown in FIG. 6, the geometric transform circuit 116*e* performs a cylindrical coordinate transform on the developed image 606. Also, the microcomputer 123 determines and extracts an image saving region (FIG. 3B) in the post-cylindrical coordinate transform image. Thus, a post-geometric transform image 607 is generated. Note that the determination criteria for the image saving region is not particularly limited, but, for example, the microcomputer 123 determines an image saving region such that an adequate image saving height can be obtained. As shown in FIG. 3A, the pixel count in the height direction at the same horizontal position in the post-cylindrical coordinate transformed image decreases the shorter the focal distance is. Accordingly, is it possible to acquire an adequate saved image height regardless of the focal distance by determining an image saving region such that the width of the image saving region decreases the shorter the focal distance is.

Note that because both the cylindrical coordinate transform and aberration distortion correction are performed by the geometric transform circuit 116e, they can be performed as separate steps as described above, or can be performed simultaneously.

In step S506, the microcomputer 123 picks up the second image. The details of the shooting are the same as in step S501. Note that in FIG. 6, the post-geometric transform image 607 that corresponds to the shooting of the first image becomes the post-geometric transform image 603 during the shooting of the second image.

In step S507, the microcomputer 123 acquires gyroscope information in order to obtain the amount of swing from the previous shooting. The microcomputer 123 acquires gyroscope information with respect to two axes, namely the yaw direction and the pitch direction relative to the digital camera 100, but it can acquire three axes, further including the roll direction that rotation about the optical axis. The output from the gyroscope 133 is angular velocity. However, because information related to the extent of swing from the previous shooting in panorama shooting is necessary, the microcomputer 123 integrates the angular velocity from the previous shooting until the present shooting, and calculates the rotational angle from the previous shooting when shooting the second and subsequent images. The microcomputer 123 stores the calculated information as gyroscope information 604 shown in FIG. 6. Then, the microcomputer 123 resets the gyroscope 133 in the same manner as in step S502.

In step S508, the microcomputer 123 converts the rotational angle into the movement amount of pixel units based on the focal distance and the angle of view of the lens obtained in step S502, the image sensor 112 information, and the like. In general, the angle of view (α) of a distortionless lens or after distortion correction is expressed below in Expression 1, where the effective focal distance is f [mm] and the width of the image sensor 112 is w [mm].

$$\alpha[°]=2\times\arctan(w[\text{mm}]\div2\div f[\text{mm}]) \quad (1)$$

Letting the size of one pixel on the image sensor 112 be p [μm] and the swing angle [°] be θ, a movement amount d [pix] in an image is expressed by Expression 2 below.

$$d[\text{pix}]=\tan(\alpha[°]\div2)\times f[\text{mm}]p[\text{μm}]\times 1000 \quad (2)$$

In step S509, the microcomputer 123 performs distortion aberration correction on the second image in the same manner as the distortion aberration correction for the first image in step S505.

Figure 6:
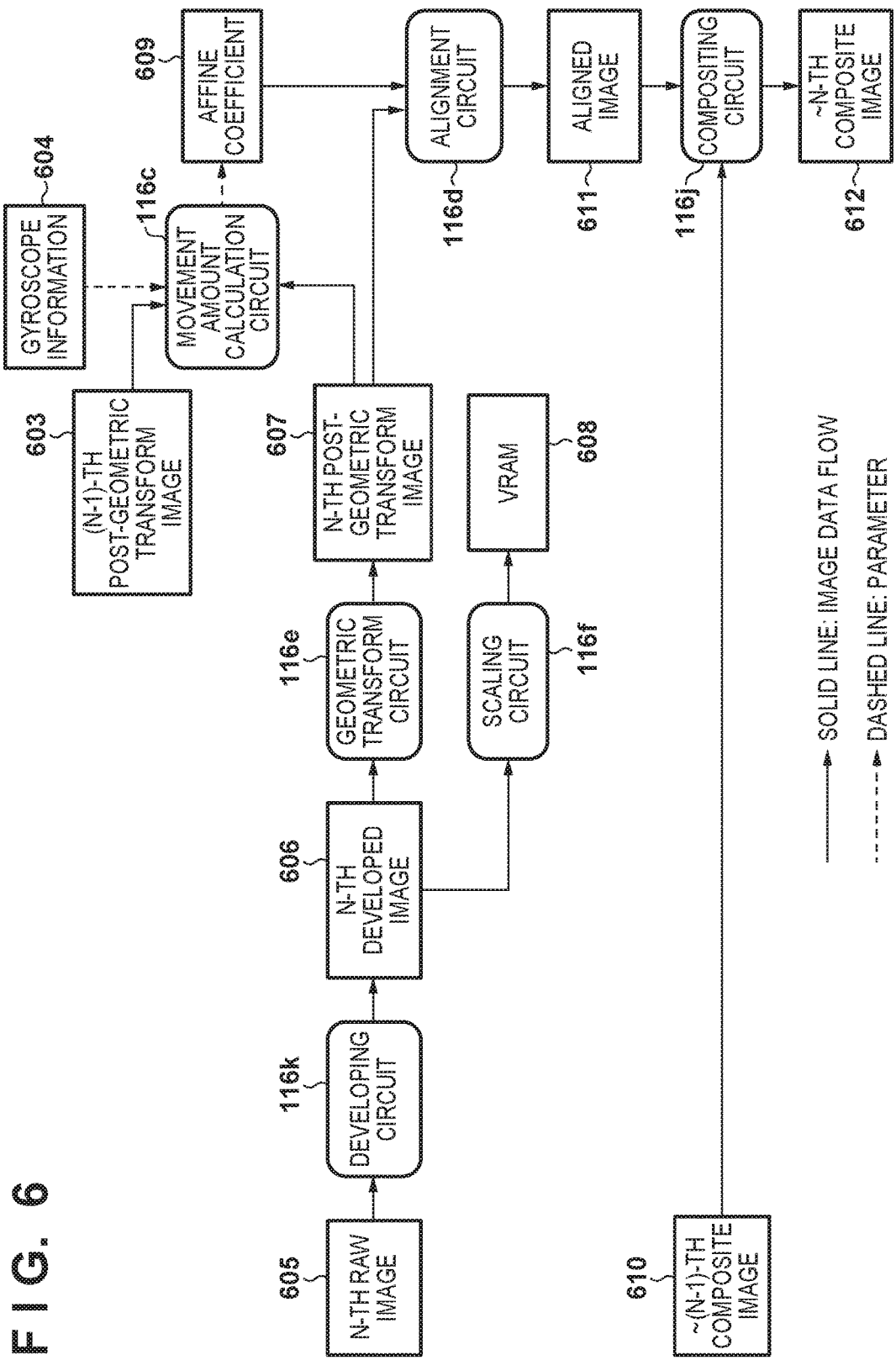
FIG. 6 is a diagram showing the data flow of panorama shooting processing.

In step S511, in the same manner as step S505, the microcomputer 123 uses the geometric transform circuit 116e to perform a cylindrical coordinate transform and extraction of the image saving region, and generates the post-geometric transform image 607 shown in FIG. 6.

In step S512, the microcomputer uses the movement amount calculation circuit 116c to calculate the movement amount based on the previous pick-up image and the current pick-up image. As shown in FIG. 6, the movement amount calculation circuit 116c calculates the amount of movement between the current image (the post-geometric transform image 607) and the previous image (the post-geometric transform image 603). Known methods can be used in relation to the calculation of the movement amount, but in the present embodiment, the movement amount calculation circuit 116c finds several feature points in an image and calculates an affine coefficient 609 by sampling. The movement amount calculation circuit 116c detects an edge, extracts a feature point, and then calculates the movement amount. For example, assume that a feature point 1 has shifted from coordinates (x1, y1) to coordinates (u1, v1), a feature point 2 has shifted from coordinates (x2, y2) to coordinates (u2, v2), and a feature point 3 has shifted from coordinates (x3, y3) to (u3, v3). In this case, Expressions 3 and 4 are obtained when represented as a simultaneous equation.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix} \quad (3)$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix} \quad (4)$$

By solving these equations, it is possible to calculate affine coefficients a to f. If four or more feature points are detected, the closest points are excluded, and the "least-squares" method is used to normalize. If three points are not found, if three extracted points are on a straight line, or if two of three points are close, those values are examined, and it is determined that the movement amount calculation failed.

If there is a large difference between the movement amount calculated from an image in this way (affine coefficient 609) and the movement amount calculated in step S508 (movement amount based on the gyroscope information 604), it is conceivable the that a repeated pattern or a moving body is included in the image. Therefore, the microcomputer 123 may calculate the movement amount again under different conditions, may treat this shot as a failure and return to the next shooting (S506), or may handle it as failed panorama shooting.

In step S513, the microcomputer 123 uses the alignment circuit 116d to perform alignment based on the movement amount (affine coefficient) calculated in step S512. That is, as shown in FIG. 6, the alignment circuit 116d uses the affine coefficient 609 to perform alignment, and generates an aligned image 611.

In step S514, the microcomputer 123 uses the compositing circuit 116j to composite images. As shown in FIG. 6, if the current pick-up image is the (N−1)-th image, the compositing circuit 116j composites a composite image 610 that is based on the first to the (N−1)-th images and the aligned image 611 that is based on the N-th image. Thus, a composite image 612 is generated. Also, if N=2, the composite image 610 will be equivalent to the post-geometric transform image 603. Also, because the image quality of the composite result will decrease in the case of a moving body such as the surface of water, the compositing circuit 116j may improve the image quality by changing the composite ratio in the boundary portions of images.

In step S515, the microcomputer 123 determines whether or not an end instruction has been given. If an end instruction has been given, processing proceeds to step S516. If an end instruction has not been given, processing returns to step S506, and if the switch SW2 126 is pressed again, the microcomputer 123 performs the next shooting, and processing is executed from step S507 to step S514 in the same manner as the previous shooting. Accordingly, using a plurality of partial images (image saving regions) that have been obtained from a plurality of images successively shot, the microcomputer 123 generates a panorama image by performing image compositing to align the overlapping regions of each pair of two partial images that are sequential in the shooting order.

In step S516, the microcomputer 123 uses the compressing/expanding circuit 116*l* to compress the composite image 612 into a general purpose format such as JPEG.

In step S517, the microcomputer 123 saves the compressed image to the memory 120. Also, at this time, the gamma correction circuit 116*b* may perform γ correction so that dark parts of the composite image are made easier to view, and perform corrections in order to unify the color tone of the overall image. Also, because the image obtained in this way has a large size, the scaling circuit 116*f* may perform scaling of the image to a size instructed by the user in advance. Furthermore, in consideration of hand shaking or the like, the trimming circuit 116*g* may perform image clipping by the largest inscribed rectangle, or by a predetermined region, before the image is saved.

Note that this shows an example of the digital camera 100 being swung in the horizontal direction, but similar processing can be executed in the case of being swung in the vertical direction.

Figure 7:
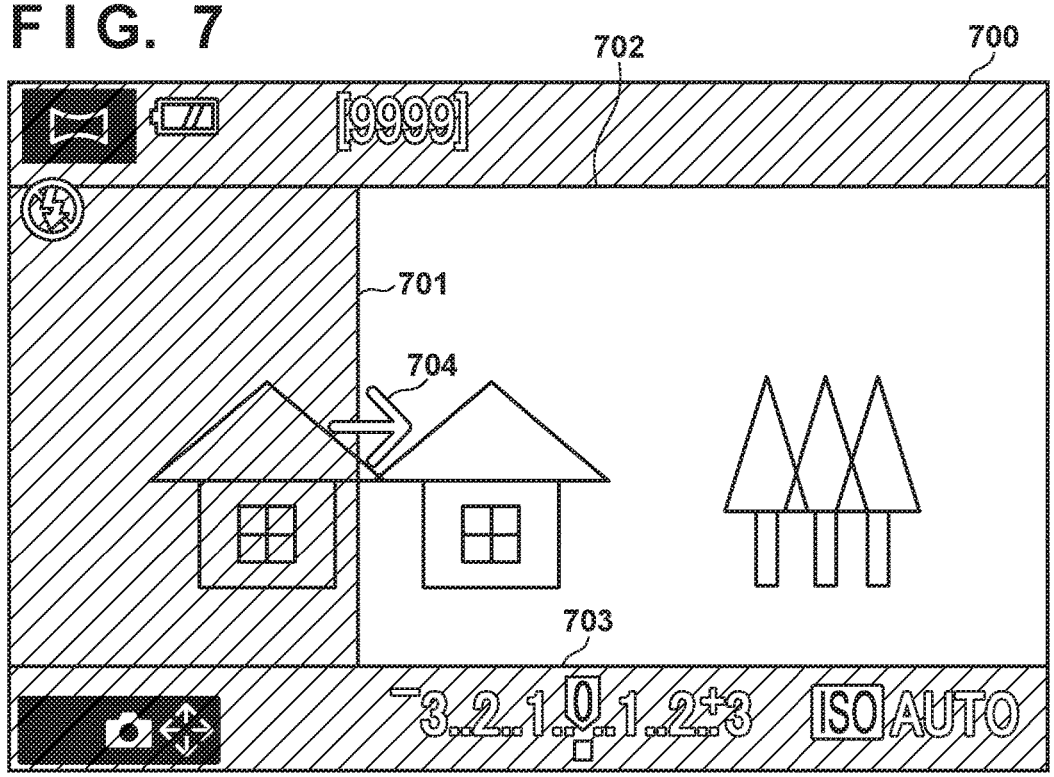
FIG. 7 is a diagram showing an example of a live view display in panorama shooting processing.

The following describes, with reference to FIG. 7, the live view display that is performed during shooting standby in the panorama shooting processing of FIG. 5. Reference sign 700 in FIG. 7 is a through-the-lens image. Reference signs 701, 702, 703 are the boundary lines between the image saving regions and other regions (unsaved regions). Reference sign 704 shows the direction of movement of the digital camera 100 during panorama shooting.

It is desirable that the display position of the border line 701 is, in the image after a cylindrical coordinate transform has been performed based on the focal length, the end of a region that is not saved as a panorama image (unsaved region). Also, it is desirable for the user to be able to recognize the unsaved region on the side opposite to the shooting direction in the shooting standby mode before the start of panorama image shooting. Also, the display positions of border lines 702 and 703 are, in the image after a cylindrical coordinate transform has been performed based on the focal length, desirably at the end in the height direction of regions that are not saved as a panorama image. Also, it is desirable to appropriately perform region display by adding, to the cylindrical transform amount, the shake amount in the case where the shooting direction of the digital camera 100 is moved.

Accordingly, in FIG. 7, the hatched regions correspond to parts of unsaved regions, while a white region corresponds approximately to an image saving region. As described in step S505 of FIG. 5, a reduction in the number of pixels in the height direction in the right side of portion of an image will occur when a cylindrical coordinate transform is performed, and therefore this portion is not extracted as an image saving region. Accordingly, the regions used in composite processing in step S514 are, among the white regions, regions that do not include the portions on the right side. However, in panorama shooting that swings the digital camera 100 in the direction of an arrow 704, there is a possibility that the right side part will be included in the image saving region in the subsequent shooting, and therefore is possibly included in the final panorama image.

Also, the microcomputer 123 may display the unsaved regions of the right side of the through-the-lens image so they are distinguishable from the image saving region. Accordingly, in the present embodiment, the microcomputer 123 may display parts of the unsaved regions so that the user can recognize them, or may display the unsaved regions in their entirety so that the user can recognize them. In other words, when performing live viewing, the microcomputer 123 displays information that indicates at least a portion of unsaved regions (predetermined regions) of the subsequent pickup image.

Also, in panorama shooting, a plurality of images (unit images) are composited to create a panorama image. For this reason, when starting shooting, it is preferable to display the end on side opposite to the movement direction of the digital camera 100 (at least a portion of the region positioned at the side opposite to the movement direction of the digital camera 100). However, as shown in FIG. 8, it is preferable to display the end on the same side as the movement direction of the digital camera 100 during shooting.

Figure 8:
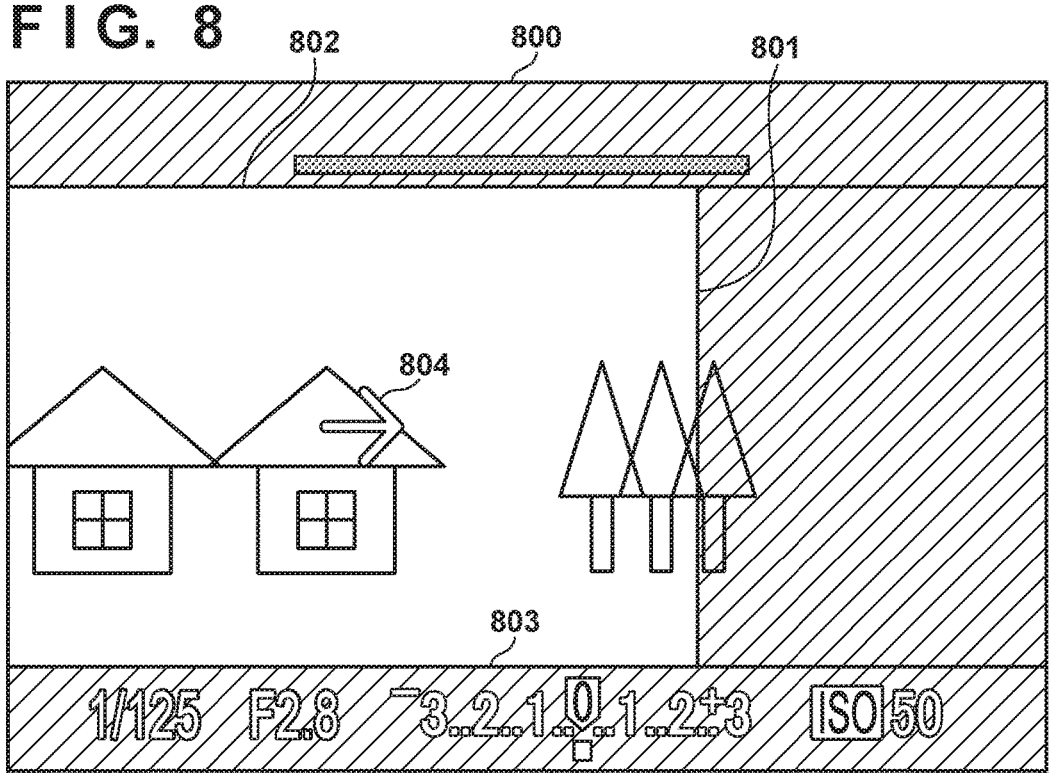
FIG. 8 is a diagram showing an example of a live view display in panorama shooting processing.

In FIG. 8, 800 is a through-the-lens image. Reference signs 801, 802 and 803 are the border lines between image saving regions and regions other than those (unsaved regions). Reference sign 804 shows the direction in which the digital camera 100 moves during panorama shooting. In this way, it is possible for the user to accurately know to what extent an image has been saved by the accurate display of the end on the same side as the movement direction of the digital camera 100 (at least a portion of the region positioned on the same side as the movement direction of the digital camera 100).

Additionally, the digital camera 100 may be configured such that it can switch between the display mode of FIG. 7 and the display mode of FIG. 8 at an appropriate timing (a timing when a predetermined condition is met). In general, during panorama shooting, the lowest pixel count for a saved image is often set. Therefore, the digital camera 100 employs the display mode of FIG. 7 that displays the end on the side opposite to the movement direction of the digital camera 100 at the start of shooting. Also, if the movement amount of the digital camera 100 reaches a movement amount that corresponds to the minimum pixel count of a saving image, the digital camera 100 switches from the display mode of FIG. 7 to the display mode of FIG. 8. In other words, if the pixel count of a panorama image that can be generated from image saving regions (partial images) corresponding to one or more images already picked-up and the next image to be picked up, is greater than or equal to a threshold value, a switch from FIG. 7 to FIG. 8 is performed. Alternatively, the digital camera 100 may perform a switch from FIG. 7 to FIG. 8 based on the number of picked-up images. For example, the digital camera 100 performs a switch from FIG. 7 to FIG. 8 if the number of images that have already been picked up is greater than or equal to a threshold value.

Figure 9:
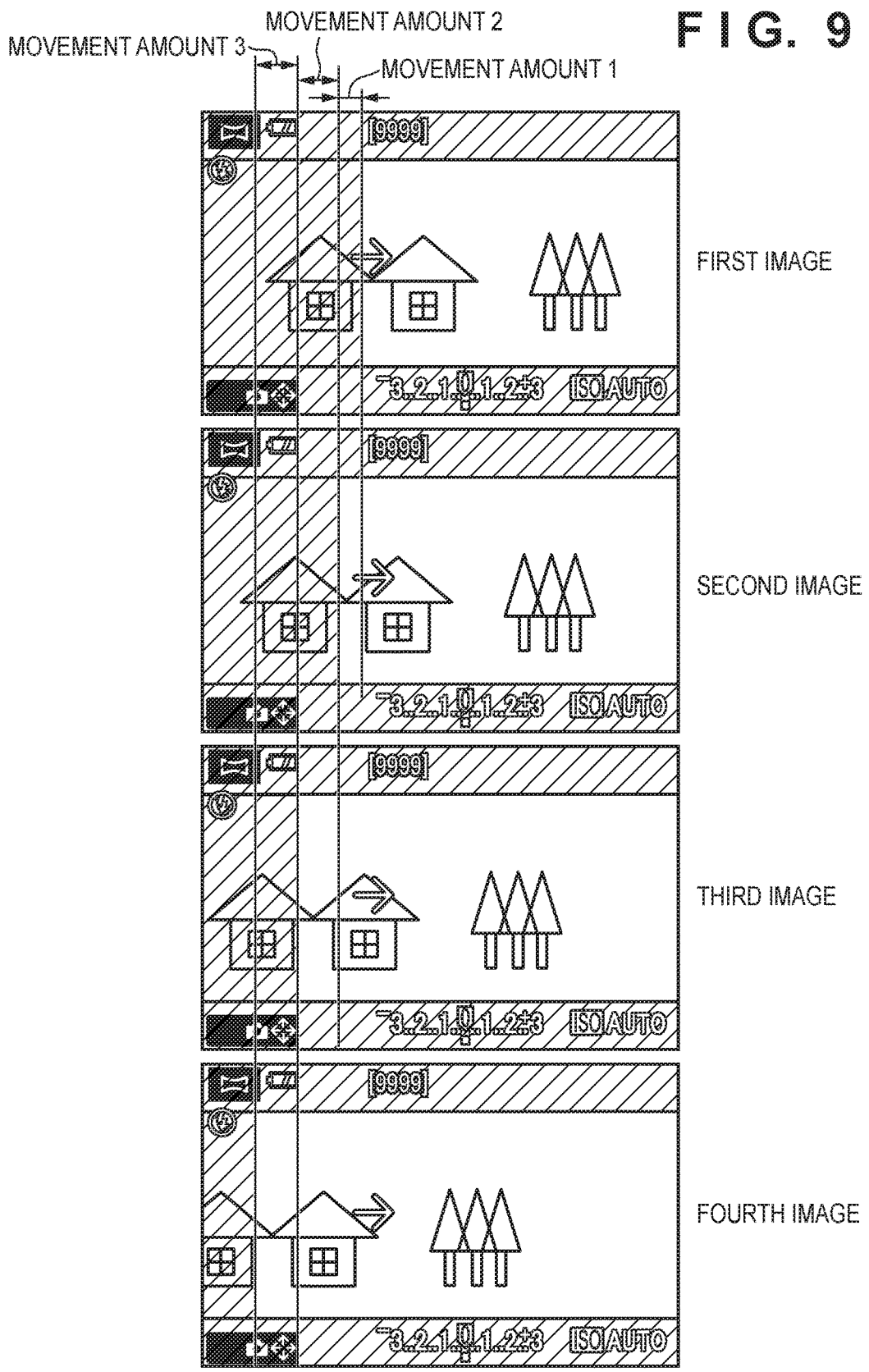
FIG. 9 is a diagram showing an example of a live view display in panorama shooting processing.

Also, as shown in FIG. 9, the digital camera 100 may, in synchronization with shooting, successively reduce the size of the region that is divided by the border line 701 of FIG. 7 according to the movement amount. That is, in FIG. 9, the digital camera 100 displays at least a portion of a region that is not included in the eventually obtained panorama so that it can be recognized by the user. In other words, the digital camera 100 displays information that indicates at least a portion of, in an unsaved region (predetermined region) of an image to be picked up next, a region included in each unsaved region of one or more images that have already been picked up.

Also, in the same manner, if the movement amount of the digital camera 100 reaches a movement amount that corresponds to the minimum pixel count of saved images, the digital camera 100 may successively enlarge the region that is divided by the border line 801 of FIG. 8 from the end on the side of the movement direction of the digital camera 100 to a predetermined region. The predetermined region mentioned here is assumed to be a region that has been set based on the cylindrical coordinate transform and the like. Also, displays may be switched in a direction perpendicular to the movement direction of the digital camera 100. That is, the regions divided by the borderline 701 or the regions divided by the borderline 801 may be switched.

Also, in FIGS. 7 to 9, the unsaved regions are indicated with hatching, but the display mode of the present embodiment is not limited to this, and it is possible to employ any display mode that allow the user to recognize unsaved regions.

As described above, according to the first embodiment, the digital camera 100 performs live view display on the display apparatus 118 during successive shooting of a plurality of images at the same time as being moved in the direction of shooting. At this time, the digital camera 100 displays information that indicates at least a portion of an unsaved region (predetermined region) of an image that is to be picked up subsequently. Thus, it is possible to support user recognition of image regions that will potentially not be included in a panorama image during shooting of images that will become the base for a panorama image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149313, filed Aug. 1, 2017, which is hereby incorporated by reference herein in its entirety.

What is claimed is:

1. An image pickup apparatus, comprising:
   an image sensor configured to successively pick up a plurality of images for compositing of a panorama image;
   a memory configured to store instructions;
   a monitor; and
   a processor connected to the memory and configured to execute the instructions to:
   specify a region that is not to be used in compositing of the panorama image in each of the plurality of images, based on a movement state of an optical system used at a time of pick-up of the plurality of images,
   wherein the monitor displays the specified region along with an image.

2. The image pickup apparatus according to claim 1, wherein the processor is further configured to execute the instructions to:
   apply a geometric transform to the plurality of images, based on the movement state of the optical system used at the time of pick-up of the plurality of images,
   extract a partial region for use in compositing of the panorama image, from the images to which the geometric transform was applied, and
   specify a region that corresponds to a region other than the partial region as the region that is not to be used in compositing of the panorama image.

3. The image pickup apparatus according to claim 2, wherein
   the geometric transform includes at least one of distortion aberration correction and a cylindrical coordinate transform.

4. The image pickup apparatus according to claim 1, wherein the processor is further configured to execute the instructions to generate the panorama image by performing image compositing on the plurality of images to superimpose overlapping regions of each pair of two images that are sequential in a pickup order.

5. The image pickup apparatus according to claim 1, wherein the monitor displays the specified region at a position on a side opposite to a movement direction in a pick-up direction in the image.

6. The image pickup apparatus according to claim 1, wherein before a predetermined condition is met, the monitor displays the specified region at a position on a side opposite to a movement direction in a pick-up direction in the image, and after the predetermined condition is met, the monitor displays the specified region at a position on a same side as the movement direction in the pick-up direction in the image.

7. The image pickup apparatus according to claim 6, wherein the predetermined condition is met in a case where a pixel count of the panorama image that can be generated from one or more previously picked-up images and an image to be picked-up subsequently is greater than or equal to a first threshold value.

8. The image pickup apparatus according to claim 6, wherein the predetermined condition is met in a case where a number of previously picked-up images is greater than or equal to a second threshold value.

9. The image pickup apparatus according to claim 1, wherein the monitor displays information that indicates at least a portion of, in the specified region of an image to be picked-up, a region included in each specified region of one or more previously picked-up images.

10. A control method executed by an image pickup apparatus having an image sensor and a monitor, comprising:

successively picking up, by the image sensor, a plurality of images for compositing of a panorama image;

specifying a region that is not to be used in compositing of the panorama image in each of the plurality of images, based on a movement state of an optical system used at a time of pick-up of the plurality of images; and displaying, on the monitor, the specified region along with an image.

11. A non-transitory computer-readable storage medium which stores a program for causing a computer of an image pickup apparatus having an image sensor and a monitor to execute a control method comprising:

successively picking up, by the image sensor, a plurality of images for compositing of a panorama image;

specifying a region that is not to be used in compositing of the panorama image in each of the plurality of images, based on a movement state of an optical system used at a time of pick-up of the plurality of images; and displaying, on the monitor, the specified region along with an image.

12. An image picjup apparatus, comprising:

an image sensor configured to successively pick up a plurality of images for compositing of panorama image;

a memory configured to store instructions;

a monitor configured to display a region in each of the plurality of images; and a processor connected to the memory and configured to execute the instructions to:

change the region when a movement state of an optical system used at a time of pick-up of the plurality of images changes.

13. The image pickup apparatus according to claim 12, wherein the processor further executes the instructions to change a size of the region when the movement state changes.

14. The image pickup apparatus according to claim 12, wherein the region is to be used in compositing of the panorama image in each of the plurality of images.

15. A control method executed by an image pickup apparatus having an image sensor and a monitor, comprising:

successively picking up, by the image sensor, a plurality of images for compositing of a panorama image;

changing a region when a movement state of an optical system used at a time of pick-up of the plurality of image changes; and displaying, on the monitor, the region in each of the plurality of images.

16. A non-transitory computer-readable storage medium which stores a program for causing a computer of an image pickup apparatus having an image sensor and a monitor to execute a control method comprising:

successively picking up, by the image sensor, a plurality of images used for compositing of a panorama image;

changing a region when a movement state of an optical system used at a time of pick-up of the plurality of images changes; and displaying, on the monitor, the region in each of the plurality of images.

* * * * *